US007853565B1

(12) United States Patent
Liskov

(10) Patent No.: US 7,853,565 B1
(45) Date of Patent: *Dec. 14, 2010

(54) METHOD AND APPARATUS FOR EFFICIENT PROPAGATION OF LARGE DATASETS UNDER FAILURE CONDITIONS

(75) Inventor: Barbara Liskov, Waltham, MA (US)

(73) Assignee: Cisco Technology, Inc., San Jose, CA (US)

( * ) Notice: Subject to any disclaimer, the term of this patent is extended or adjusted under 35 U.S.C. 154(b) by 216 days.

This patent is subject to a terminal disclaimer.

(21) Appl. No.: 11/648,099

(22) Filed: Dec. 29, 2006

Related U.S. Application Data

(63) Continuation of application No. 10/409,851, filed on Apr. 9, 2003, now Pat. No. 7,158,985.

(51) Int. Cl.
*G06F 7/00* (2006.01)
*G06F 17/00* (2006.01)
*G06F 21/00* (2006.01)
*G06F 13/00* (2006.01)
*G06F 15/16* (2006.01)

(52) U.S. Cl. .................. 707/648; 705/53; 710/111; 709/208

(58) Field of Classification Search ............ 705/53; 707/202, 203; 710/111
See application file for complete search history.

(56) References Cited

U.S. PATENT DOCUMENTS

| | | | | |
|---|---|---|---|---|
| 5,047,918 A | * | 9/1991 | Schwartz et al. ............ | 1/1 |
| 5,446,884 A | * | 8/1995 | Schwendemann et al. ......... | 1/1 |
| 5,857,206 A | * | 1/1999 | Tsutsumitake .............. | 1/1 |
| 5,878,434 A | * | 3/1999 | Draper et al. .............. | 1/1 |
| 6,314,434 B1 | * | 11/2001 | Shigemi et al. ............. | 707/695 |
| 2002/0099728 A1 | * | 7/2002 | Lees et al. ................ | 707/203 |
| 2002/0194133 A1 | * | 12/2002 | Castueil et al. ............. | 705/53 |
| 2003/0018732 A1 | * | 1/2003 | Jacobs et al. .............. | 709/208 |
| 2003/0023620 A1 | * | 1/2003 | Trotta ..................... | 707/203 |
| 2003/0050939 A1 | * | 3/2003 | Dietz et al. ............... | 707/203 |
| 2003/0229742 A1 | * | 12/2003 | Moss ..................... | 710/111 |

OTHER PUBLICATIONS

Gene T.F. Wuu; Efficient Solutions to the replicated log and dictionary problems; 1984; ACM; pp. 232-242.*

* cited by examiner

*Primary Examiner*—Neveen Abel Jalil
*Assistant Examiner*—Jermaine Mincey
(74) *Attorney, Agent, or Firm*—Hickman Palermo Truong & Becker LLP

(57) ABSTRACT

A network of nodes caches replicated datasets in which dataset changes are efficiently propagated as a set of changes even under failure conditions. A master node and a plurality of subordinate nodes in the network each maintain a copy of the dataset and a change log storing change events in the dataset in that node. The change log further includes a rename chain having a plurality of linked rename records created in response to a new master gaining control of the dataset. The master node computes and propagates dataset changes to the subordinate nodes as a set of change events. If the master node fails, one of the subordinate nodes becomes temporary master and continues to propagate dataset changes using its dataset and its change log in response to update requests from other nodes where the update request contains information from the change log of the requestor node.

13 Claims, 5 Drawing Sheets

METHOD AND APPARATUS FOR EFFICIENT PROPAGATION OF LARGE DATASETS UNDER FAILURE CONDITIONS

CROSS REFERENCE TO RELATED APPLICATIONS

The present application is a continuation of U.S. application Ser. No. 10/409,851, filed on Apr. 9, 2003 now U.S. Pat. No. 7,158,985.

BACKGROUND

A Content Distribution Network (CDN) enables web content from an origin server to be distributed to caching servers at various locations in the Internet. The CDN then enables the web content to be accessed from those caching servers. The caching servers are also called content engines, or alternatively, content servers. Content routers in the CDN route user requests to an appropriate caching server. When a user requests a Web page, for example, that is part of the CDN, the CDN typically redirects the request from the origin server to a caching server that is closest to the user. The caching server delivers the cached content to the user. The CDN also communicates with the origin server to deliver any content that has not been previously cached. This service is effective in speeding the delivery of content of Web sites with high traffic and also of Web sites that have geographically distributed customers. Additionally, CDNs can be configured to provide protection to origin servers from large surges in traffic. Distribution of content reduces the load on the origin servers where content originates. Furthermore, users are provided with improved access to content because the users are able to obtain content from a caching server that is closer (in terms of network distance and congestion) and less heavily loaded than the origin server.

To make content available through the CDN, a content provider defines one or more "channels". Each channel contains a set of files that is typically expected to be accessed by the same set of users. For example, a channel may contain training videos intended to be used by sales people, or advertisements directed at an organization's customers. A subset of the content servers in the CDN is assigned to each channel. The content servers in the assigned subset are typically servers located conveniently with respect to the intended set of users of the channel.

Files in a channel are pre-positioned at the content servers assigned to that channel. Pre-positioning enables greater certainty of availability of the content to accessing users. The content servers assigned to the channel may be behind a slow link relative to the origin server, and the files themselves may be very large. Therefore, moving the content from the origin server to a content server assigned to the channel can be time-consuming. Pre-positioning the content generally reduces delay when users attempt to access files.

Pre-positioning includes an indication of what content is carried in the channel. One technique for describing current channel content is a "manifest file." The manifest file describes the content through a set of rules. Rules can be as simple as providing the file name of a file in the channel. Rules can also be more complicated, e.g., indicating all files in a directory with a particular suffix.

Servers in the channel periodically evaluate the rules in the manifest file to determine the current content of the channel. The result of evaluating the rules is a "catalog", also referred to as a dataset, that identifies the files currently in the channel with their associated properties, e.g., an indication of where the file is coming from, or how often the file should be checked to see whether it has been modified, and therefore, needs to be re-fetched.

The set of caching servers providing content in a channel can be very large. It is not desirable for the caching servers to evaluate the rules in the manifest file individually, since this can lead to too much communication and load at the site that stores the manifest file. Optimally, only one of the caching servers in the subset assigned to a channel carries out this computation. That one caching server, generally referred to as the master server, then propagates the results to the other caching servers. The master server preferably does not propagate changes by re-sending the entire catalog that results from the manifest file evaluation. The catalog can be extremely large, and it is likely that the catalog will have changed very little since the last time the rules were evaluated. Instead, the master server preferably computes a set of changes and propagates the set of changes. This way, the communication within the system needed to keep catalogs up to date at all the caching servers assigned to the channel is kept to a minimum.

SUMMARY OF THE INVENTION

Current technology for maintaining a large dataset in a hierarchical network does not provide for efficient propagation of change computations among subordinate caching servers when the master server fails. This can result in failure to accurately maintain datasets at subordinate nodes, and in congestion at the server maintaining the manifest file if the caching servers in the channel attempt to individually access the manifest. The scheme of propagating changes among the caching servers in the channel can be made fault-tolerant by having one of the caching servers take over as temporary master server should the master server fail. The temporary master server continues to produce changes when it takes over from the master server. It is desirable to continue to propagate information about the dataset by sending only changes, since the alternative of re-sending the entire dataset can be prohibitively expensive. Propagating changes from the temporary master server, however, can be problematic. The temporary master server determines changes based on the value of its current dataset, which may not be identical to the master dataset used by the master server. Furthermore, other caching servers may have received dataset changes from the master server that the temporary master server does not have. Therefore, caching servers in the channel could receive incorrect information from the temporary master server which can cause these caching servers to miss files that they ought to pre-position.

The problems described above can occur in any distributed system maintaining a large dataset, not only in content delivery networks. The general problem concerns a very large dataset whose content needs to be kept up-to-date at a large number of nodes connected by a network, and whose content is determined by periodically carrying out a computation that is expensive and that typically results in few changes relative to the overall size of the dataset. In such a situation, having a single node carry out the computation and communicate the result to the other nodes as a set of changes is a preferred solution, especially when a large number of nodes need to be kept up-to-date about the dataset, and where some of the nodes may need to communicate over a slow or low-bandwidth link. When the master node, which is responsible for computing the current content of the dataset, fails, some other node must take over the computation, yet continue to inform the remaining nodes of dataset changes.

Embodiments of the present invention significantly overcome such deficiencies and provide mechanisms and techniques for efficiently and accurately propagating dataset changes among nodes by using a change log. In the present invention, each node in the channel, including the master node as well as all subordinate nodes, maintains a change log recording changes to the dataset stored at the node. In the change logs, each change to the dataset is stored as a numbered event. The numbered events further include name change records storing dataset name changes. Each time a node takes over as master, either a subordinate node taking over for the master server or the master server resuming control from a temporary master server, the incoming master server changes the name of the dataset. The new dataset name and old dataset name are recorded in a name change record that the incoming master server inserts into its change log and propagates along with other changes to the dataset. The name change records form a rename chain, i.e., a chain of linked indicators of dataset commonality within the change log. The name change record acts as a marker useful in determining where a particular dataset fell out of synchronicity with the master dataset. Change information is propagated using the change log. The name record is used to determine how much of an update is needed by a requesting node. When a server in the channel requests an update, the requesting node includes change log information including a most recent event and at least one name change record. A current master server receives the information and creates an update of change events in response to the change log information sent by the requesting node.

More specifically, embodiments of the invention provide methods and apparatus that maintain a stored dataset replicated from a master dataset. One such method embodiment comprises a requestor node performing the step of maintaining a change log of changes made to the stored dataset where each change is recorded as an event in a list of events. The list of events includes an indicator chain in which each link is an indicator of dataset commonality. The requestor then provides an update request to a responder node to update the stored dataset where the update request includes a first reference to the list of events and a second reference to the indicator chain. The requestor then receives an update response from the responder node. The update response includes update information derived from the first reference and the second reference. The requestor then reconciles the change log and the update response to update the dataset stored at the requestor node. The requestor is able to maintain a replicated dataset by processing only changes to the dataset without having to receive an entire dataset as the update.

In another embodiment of the invention, the indicator chain is a rename chain in which each link is a rename record including a new dataset name and an associated old dataset set name. In one alternate embodiment of the indicator chain, the second reference to the indicator chain in the update request is a most recent rename record. In another alternate embodiment of the indicator chain, the second reference to the indicator chain in the update request is to a plurality of rename records in the requestor's indicator chain. In these embodiments, dataset rename records are used to mark events where the various datasets may become unsynchronized with the master dataset. The rename chain enables the requestor to identify the changes it needs to become resynchronized rather than having to request an entire new dataset.

In another embodiment of the invention, the requestor changes the dataset name in response to a new rename record received in the update response. This enables the requestor to maintain a dataset name consistent with the other caching nodes in the system further enabling dataset synchronicity.

In another embodiment of the invention, the first reference in the update request is a most recent event in the change log and the second reference in the update request matches an indicator in a responder indicator chain at the responder node and the update response contains change events that follow the most recent event, the requestor adds the change events contained in the update response to the requestor change log and modifies the stored dataset according to the change log including the added change events. In this embodiment, the requestor takes propagated change events and updates its copy of the dataset.

In another embodiment of the invention, the first reference in the update request is a most recent event in the change log, the second reference matches an indicator in an indicator chain at the responder node and the update response contains change events based on a third reference to the list of events sent by the responder in the update response, the third reference being less recent than the first reference. The requestor places the events from the change log between the third reference and first reference into an undo set. The requestor than processes the update response and compares each change event in the update response to each event in the undo set. Each time the requestor finds a match between an update response event and an undo set entry, the requestor removes the entry from the undo set. If entries remain in the undo set after the update request has been processed, the requestor, in a first embodiment of the invention, requests a complete dataset to replace the requestor's dataset. In a second embodiment of the invention, the requestor requests status information on each of the files remaining in the undo set. In this embodiment, the requestor avoids errors that may occur when the requestor has received change events from the master node that the responder has not received.

In another embodiment of the invention, each node stores at least one pre-state which is stored undo information. When a requestor receives an update response having change events less recent than the requestor's most recent change event, the requestor undoes the change log according to a most recent pre-state. The requestor then reconciles the undone change log and the update response to modify the stored dataset. In this embodiment, the requestor is able to undo locally in order to avoid errors that may occur when the requestor has received change events from the master node that the responder has not received.

In another embodiment of the invention, the requestor receives a complete dataset and a partial change log in the update response and the requestor replaces its stored dataset with the complete dataset and replaces the requestor change log with the partial change log. The partial change log provides a short history of recent change events enabling the requestor to provide updates to other nodes if necessary.

In another embodiment of the invention, a caching node takes over as master node in the event of the failure of the master node. The caching node maintains a change log in which each change to the dataset is recorded as an event in a list of events and the list of events includes an indicator chain where each link is an indicator of dataset commonality. The caching node detects that the master node has become nonfunctional. The caching node then accesses a manifest file to compute changes to the dataset. The caching node then updates its stored dataset according to the manifest file and records change events to the change log. In this way, the caching node takes over the task of computing changes from the manifest file and holds itself out to the network of caching nodes as the temporary master node. In another embodiment of the invention, the caching node records change events by adding an indicator to the list of events and linked to the indicator chain. The step of adding an indicator includes the steps of renaming the stored dataset, creating a new rename record in response to renaming the dataset and adding the new rename record to the change log. The dataset is renamed each time a new master takes over the task of computing changes to the dataset. Creating a rename chain provides markers of dataset commonality that can be traced through a series of change events.

In another embodiment of the invention, a responder has taken on the role of temporary master in the event of a failure of the master node. The responder maintains a change log of changes made to the stored dataset where each change is recorded as an event in a list of events, where the list of events includes an indicator chain where each link is an indicator of dataset commonality. The responder receives an update request from a requesting node storing a replicated dataset where the update request includes a first reference to a change log event in the requesting node change log and a second reference to an indicator in an indicator chain in the requesting node. The responder then provides an update response to the requesting node including information about the stored dataset derived from the change log based on the first reference and the second reference. The responder, acting as temporary master, thus efficiently propagates dataset updates to caching nodes.

In another embodiment of the invention, the responder indicator chain is a rename chain in which each link is a rename record including a new dataset name and an associated old dataset name. In an alternative embodiment, the second reference in the update request, which is a reference to the indicator chain, is a new rename record. In a further alternative embodiment, the second reference in the update request, the reference to the indicator chain, is a reference to a plurality of rename records in the indicator chain. The rename chain enables the requestor to identify the changes it needs to become resynchronized rather than having to request an entire new dataset.

In another embodiment of the invention, a computerized device for maintaining a stored dataset replicated from a master dataset has a memory and a storage device coupled to a controller. The storage device stores the stored dataset and a change log having changes to the dataset recorded as a list of events. The list of events includes an indicator chain where each link in the indicator chain is an indicator of dataset commonality. The controller is configured to maintain the change log and to provide an update request to a responder node to update the stored dataset. The update request includes a first reference to the list of events and a second reference to the indicator chain. The controller receives an update response from the responder node where the update response includes information about a responder dataset derived from the first reference and the second reference. The controller reconciles the change log and the update response to update the stored dataset. This computerized device maintains a stored dataset that is substantially current to the master dataset by updating using sets of changes propagated to it from another node.

In another embodiment of the invention, a computerized device maintains a stored dataset to be replicated to at least one other node. The computerized device has a memory and a storage device coupled to a controller. The storage device stores the stored dataset and a change log having changes to the dataset recorded as a list of events. The list of events includes an indicator chain where each link in the indicator chain is an indicator of dataset commonality. The controller is configured to access a manifest file to compute dataset changes, maintain the change log with the computed changes, and to provide an update response in response to receiving an update request. The update request is transmitted by a requesting node and includes a first reference to a change log event in a requesting node change log and a second reference to an indicator in a requesting node indicator chain. The update response includes information about the stored dataset derived from the change log based on the first reference and the second reference. The computerized device acts as temporary master node in the event of failure of the prior master node and propagates dataset changes as a set of change events to other nodes in order to efficiently maintain replicated datasets.

In another embodiment of the invention, a system for maintaining consistency among replicated datasets has a master node and a plurality of subordinate nodes where the master node stores a master dataset and each of the plurality of subordinate nodes stores a subordinate dataset. The master node and each of the subordinate nodes each maintain a change log in which the nodes record changes to the datasets as a list of events. The list of events includes an indicator chain where each link in the indicator chain is an indicator of dataset commonality. Over the course of system operation, the master node fails and at least one of the subordinate nodes detects the failure. The subordinate nodes select a subordinate node to take over as a temporary master node. The temporary master adds an indicator to the indicator chain in its list of events in the change log, accesses the manifest file, updates its change log according to the manifest file and then updates its dataset according to the change log. The temporary master receives an update request from one of the other subordinate nodes. The update request includes a first reference to a change log event in the other subordinate node's change log and a second reference to an indicator in the other subordinate node's indicator chain. The temporary master node provides an update to the other subordinate node including information about the dataset of the temporary master node derived from the change log of the temporary master based on the first reference and the second reference. When the master node recovers, the temporary master receives an update request from the master node. The master node update request includes a third reference to a master node change log event and a fourth reference to an indicator in the master node's indicator chain. The temporary master provides the master node with an update in response to the master node update request derived from the temporary master change log based on the third reference and the fourth reference. The temporary master node then returns control of the dataset to the master node. In this system, a temporary master node takes over when the master node fails and is able to continue providing dataset changes to the other nodes as sets of change events. Propagating change events is much more efficient than sending entire datasets to nodes requesting update information about their datasets.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

DETAILED DESCRIPTION

In a system for maintaining a dataset having a master node storing a master dataset and a plurality of subordinate nodes having replicated datasets, changes to the dataset are efficiently propagated through the nodes even when the master node fails and a backup node takes over as temporary master. Each node maintains a change log where each change to the dataset is stored as a numbered event. The numbered events further include name change records storing a dataset name change. Each time a node takes over as master, either a root node that is the original master server or a subordinate node as temporary master server, the incoming master server changes the name of the dataset. The new dataset name and old dataset name are recorded into a name change record, also referred to as a rename record, that the master server inserts into its change log and propagates along with other dataset changes to the other nodes. The name change records in the change log form a chain of linked indicators of dataset commonality within the change log. The master server, or temporary master server, uses information from the change log including the name change record to determine how much of an update is needed by a requesting node and so efficiently propagate changes to the dataset.

Figure 1:
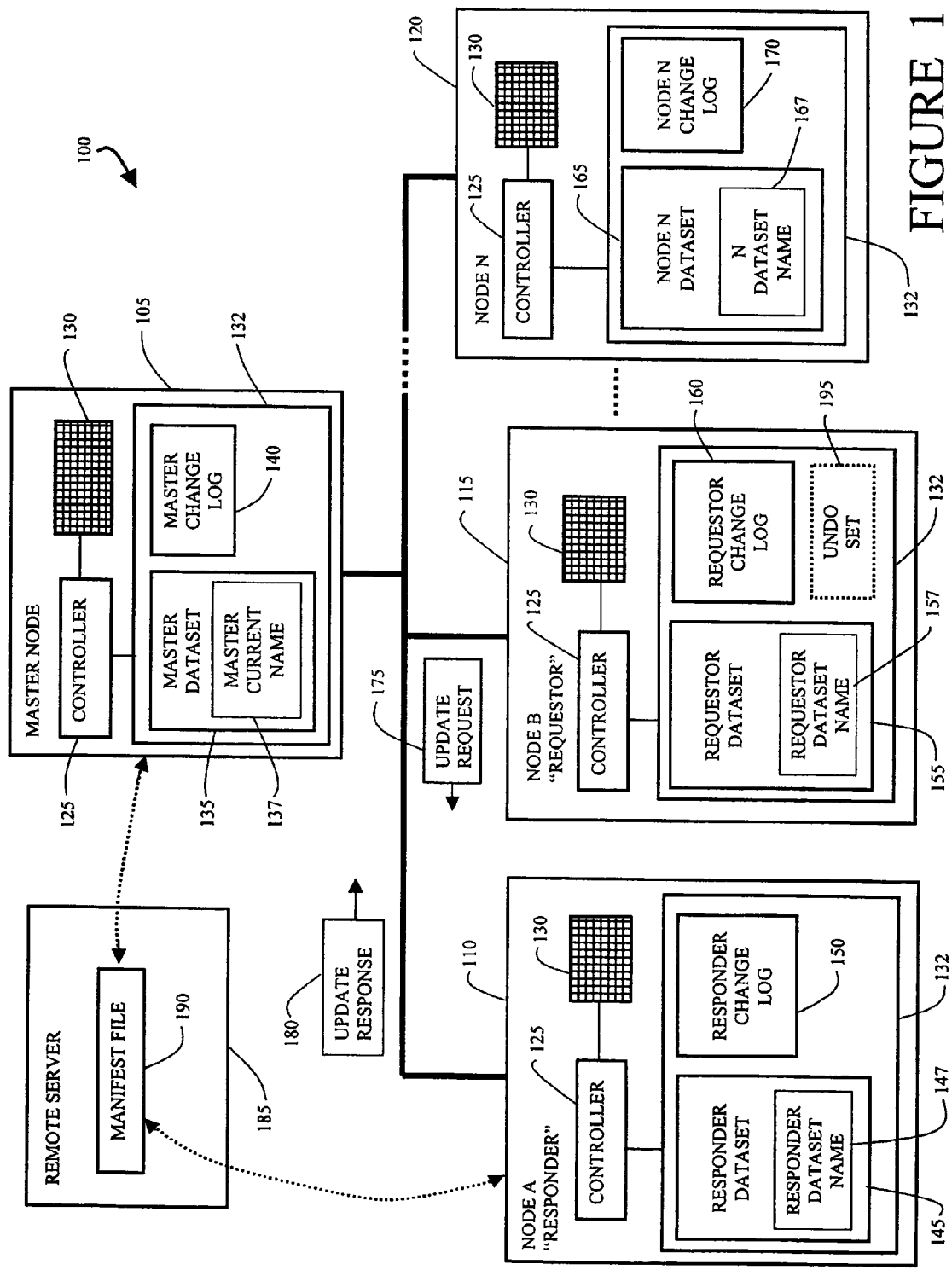
FIG. 1 is a block diagram of a network of nodes including an embodiment of a dataset propagation system according to the principles of the present invention.

FIG. 1 shows a network 100 of nodes including an embodiment of a dataset propagation system according to the principles of the present invention. The nodes include a master node 105, node A 110, node B 115, and node N 120. Node A 110, node B 115 and node N 120 are caching nodes subordinate to the master node 105. In this example implementation, node A 110 will also be referred to as a responder and node B 115 will also be referred to as a requestor. Each node, the master node 105, node A 110, node B 115, and node N 120, has a controller 125 and a memory 130 and a storage device 132. The master node 105 maintains, and stores in its storage device 132, a master dataset 135 and a master change log 140. Node A 110, the responder, maintains a responder dataset 145 and a responder change log 150. Node B 115, the requestor, maintains a requestor dataset 155 and a requestor change log 160. Each dataset has a name. The master dataset 135 has a master current name 137; the responder dataset 145 has a responder dataset name 147; the requestor dataset 155 has a requestor dataset name 157; and the node N dataset 165 has a current name N 167. When the datasets 135, 145, 155, 165 are synchronized, the current names of the datasets 137, 147, 157, 167 should match each other. A non-matching current dataset name is an indication that the dataset is out of synchronization. Node B 115, the requestor, also has an undo set 195 under certain circumstances that will be described below. Node N 120 maintains a node N dataset 165 and a node N change log 170. A remote server 185 maintains a manifest file 190.

In this example embodiment of the invention, the nodes 105, 110, 115, 120 are configured as a CDN in which the nodes 105, 110, 115, 120 are assigned to a particular channel. Each dataset 135, 145, 155, 165 contains information about the files currently in the channel served by the nodes 105, 110, 115, 120. Typically, the dataset 135, 145, 155, 165 also associates some additional information with each file, e.g. stating how often to refresh the file. Changes in the files to be carried in the channel are made at the manifest file 190. The manifest file 190 describes the content through a set of rules.

The master dataset 135 is created by the master node 105 when the master node 105 is first assigned to the channel. The master node 105 periodically contacts the remote server 185 and processes the manifest file 190 to detect any changes. Generally, there are two kinds of changes: additions (either to add a new file to the channel or to change the associated information) and deletions (to remove an existing file from the channel). When the master node 105 determines the changes to make to the master dataset 135, the master node 105 includes the changes to the master change log 140. The master change log 140 contains a sequence of change events, each of which describes the addition or deletion of a file to the dataset. Each event has an event number, and events are entered in the master change log 140 in event number order. Since the master change log 140 can grow without bound, the master change log 140 is truncated periodically. Truncation, for example, involves removing all events less than some specified number.

The datasets 145, 155, 165 of the subordinate nodes 110, 115, 120 are configured similarly to the master dataset 135. Ideally, all the datasets 135, 145, 155, 165 contain the same information. In practice, the subordinate nodes 110, 115, 120 receive information asynchronously and therefore may not contain the same information at any single moment in time. The missing data from any dataset are those recent events not yet received because of asynchronous data distribution. The error of omitted data where some change events are not received and then more recent events are received thereby creating a "hole" in the change log does not occur in this system. The change logs 150, 160, 170 of the subordinate nodes 110, 115, 120 are configured similarly to the master change log 140. Each change log 140, 150, 160, 170 contains a sequence of change events associated with the dataset 135, 145, 155, 165 of the particular node owning the change log 140, 150, 160.

Subordinate nodes such as node B, the requestor 115, periodically request dataset updates from the master node 105. To do this, the requestor 115 sends an update request 175 to the master node 105. The update request 175 includes a highest event number from the requestor change log 160. The update request 175 also includes, in a first embodiment, a most recent rename record. In an alternative embodiment, the update request 175 includes all rename records in the requestor change log 160. In a further alternative embodiment, the update request 175 includes a channel identifier. The master node 105 receives the update request 175 from the requestor 115 and creates an update response 180 using the information provided by the requestor 115 in the update request 175. The master node 105 transmits the update response 180 to the requestor 115. The update response 180 contains all events that requestor 115 is missing. When the requestor 115 receives the update response 180, the requestor 115 reconciles the data in the update response 180 with the events in the requestor change log 160 and then updates the requestor dataset 155 according to the updated requestor change log 160.

In the event of the failure of the master node 105, node A 110, the responder, takes over as temporary master node and responds to update requests. As the temporary master node, the responder 110 takes over the tasks of processing the manifest file 190 to computer dataset changes and of propagating information to the remaining nodes 115, 120 as a set of changes. At this point, the responder 110 knows up to some event number b#. The responder 110 processes the manifest file 190 and produces its own set of changes. These changes, however, are based on the responder dataset 145, which reflect events the responder 110 learned up to b#. The master node 105, however, might have produced events beyond b# before it failed. Further, the master node 105 may have propagated these events to other nodes 115, 120, since communication about changes to the dataset happens asynchronously. Where the other nodes 115, 120 have information that the responder 110 does not have, there is a possibility of error. For example, it is possible that when the master node 105 processed the manifest file 190, the master node 105 found that a file f had been deleted, and produced a delete event that was propagated to some subordinate nodes 115, 120 but not to the responder 110. It can be the case, however, that when the responder 110 processes the manifest file 190, that file f has been resurrected. Since the responder 110 does not know about the delete event, the responder 110 does not produce an add event for file f. Therefore, it is possible that the subordinate nodes 115, 120 that had learned about the delete event of file f will not put file f back in their datasets. In order to mitigate the sources of error described above, the present invention provides updates to requesting nodes based on both event number and the rename chain in the change logs, and further, the present invention provides for the undo set 190 at the requesting server 115 as will be described below.

Figure 2:
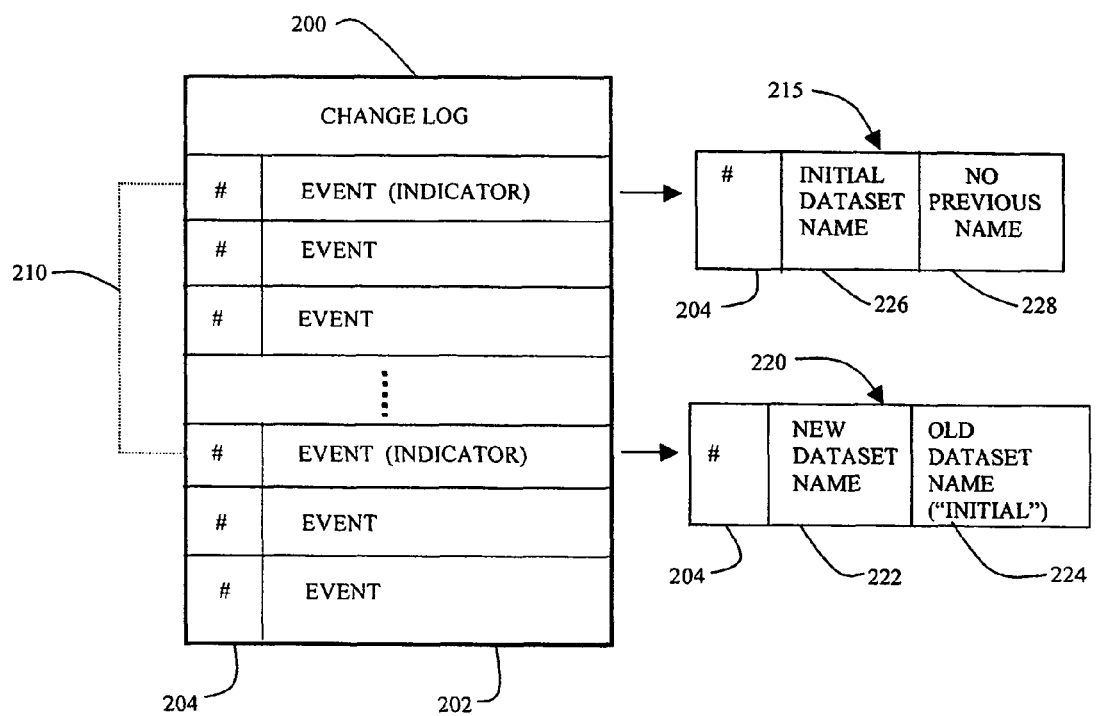
FIG. 2 is a block diagram of a change log of FIG. 1.

FIG. 2 shows a change log 200, such as any one of the change logs 140, 150, 160, 170 of FIG. 1. All of the change logs 140, 150, 160, 170 are similarly configured. The operations to the change log 200 described below take place in different nodes 105, 110, 115, 120 and thus actually take place in several different change logs 140, 150, 160, 170, however because changes are propagated among the nodes 105, 110, 115, 120 and the general case is that the change logs have substantially the same information, the change log 200 will be discussed as a single element shared by the nodes 105, 110, 115, 120 for clarity and ease of description. For similar reasons, the dataset operations described below will be described as occurring to a single dataset shared by the nodes, for example the master dataset 135.

The change log 200 contains a sequence of change events in which each event 202 describes a dataset change such as the addition or deletion of a file. Each event 202 has an event number 204, and events 202 are entered in the change log 200 in event number order. In an alternative embodiment of the invention, the event number is implicit. That is, the event number 204 is not contained in the event record 202, but rather the event number 204 is deduced by the position of the event record 202 in the change log 200. Since the change log 200 can grow without bound, the change log 200 is truncated periodically. Truncation typically involves removing all events less than some specified event number. The change log 200 further includes a rename chain 210. The rename chain 210 is a series of linked rename records. The rename chain 210 of FIG. 2 contains an initial dataset name record 215 and a rename record 220. The initial dataset name record 215 has an initial dataset name 226 and an indicator that there is no previous dataset name 228, and accordingly no previous record to which the initial dataset name record 215 is linked. The rename record 220 has a new dataset name 222 and an old dataset name 224. Each time there is a shift in the node that is generating events for the dataset 135, the incoming node produces a new name for the dataset 135. The dataset 135 is named when the dataset 135 is first produced, when a backup node takes over as temporary master node, when the original master node 105 resumes processing, and so on.

For example, when the master node 105 creates the master dataset 135, the master node 105 also names the master dataset 135 and places the initial name record 215 into the change log 200 as the first entry. The initial name record 215 has the initial name 226 for the dataset 135 and the no previous name indication 228 showing that the record 215 is not linked to any previous rename records. In the event that the master node 105 fails, the responder 110 takes over and produces a new name for the dataset 135 and records the new dataset name 222 and the previous dataset name 224, which in this case is the initial dataset name, in a rename record 220. The responder 110 places the rename record 220 as a next entry 202 in the change log 200. In addition to the new dataset name 222 and the previous dataset name 224, the rename record 220 contains an event number 204 of the rename record 220. In a first embodiment of the invention, the event number 204 of the rename record is stored in the rename record itself. In a second embodiment of the invention, the event number 204 is determined implicitly from the position of the rename record in the change log 150. Each time the dataset 135 is renamed, another rename record 220 is added to the change log and included in the rename chain 210. Thus, the rename record 220 preserves the take-over history of the dataset 135 in that it records not only dataset name changes but also indicates the event number known to the incoming node when that node took over as master. The name change records form a chain of linked indicators of dataset commonality within the change log. The dataset name changes indicates each change of server acting as master. This is the only point where the various stored datasets are may fall out of synchronicity other than the asynchronicity of requestors missing recent events. The name change record acts as a marker useful in determining where a particular dataset fell out of synchronicity with the master dataset 135.

As time passes, the failed master node 105 may recover and resume operations on the dataset 135 or the responder 110 may fail and another node may take over as temporary master node. In the case of a second node taking over as temporary master node, the second node produces a new dataset name and stores the new dataset name in a new rename record 220 as the next event 202 in the change log 200.

Since a rename record 220 is produced each time responsibility for the dataset switches to a different node 105, 110, 115, 120, there can be many rename records 220 in the rename chain 210 in the change log 200. The most recent rename record 220 in the log maps a current dataset name to some earlier name. The rename record 220 before the most recent rename record maps that earlier dataset name to a still earlier name. If nodes never removed entries from the log, the rename chain 210 would go all the way back to the initial name for the dataset. The change log 200, however, is periodically truncated and therefore the rename chain 210 is typically also truncated.

Figure 3:
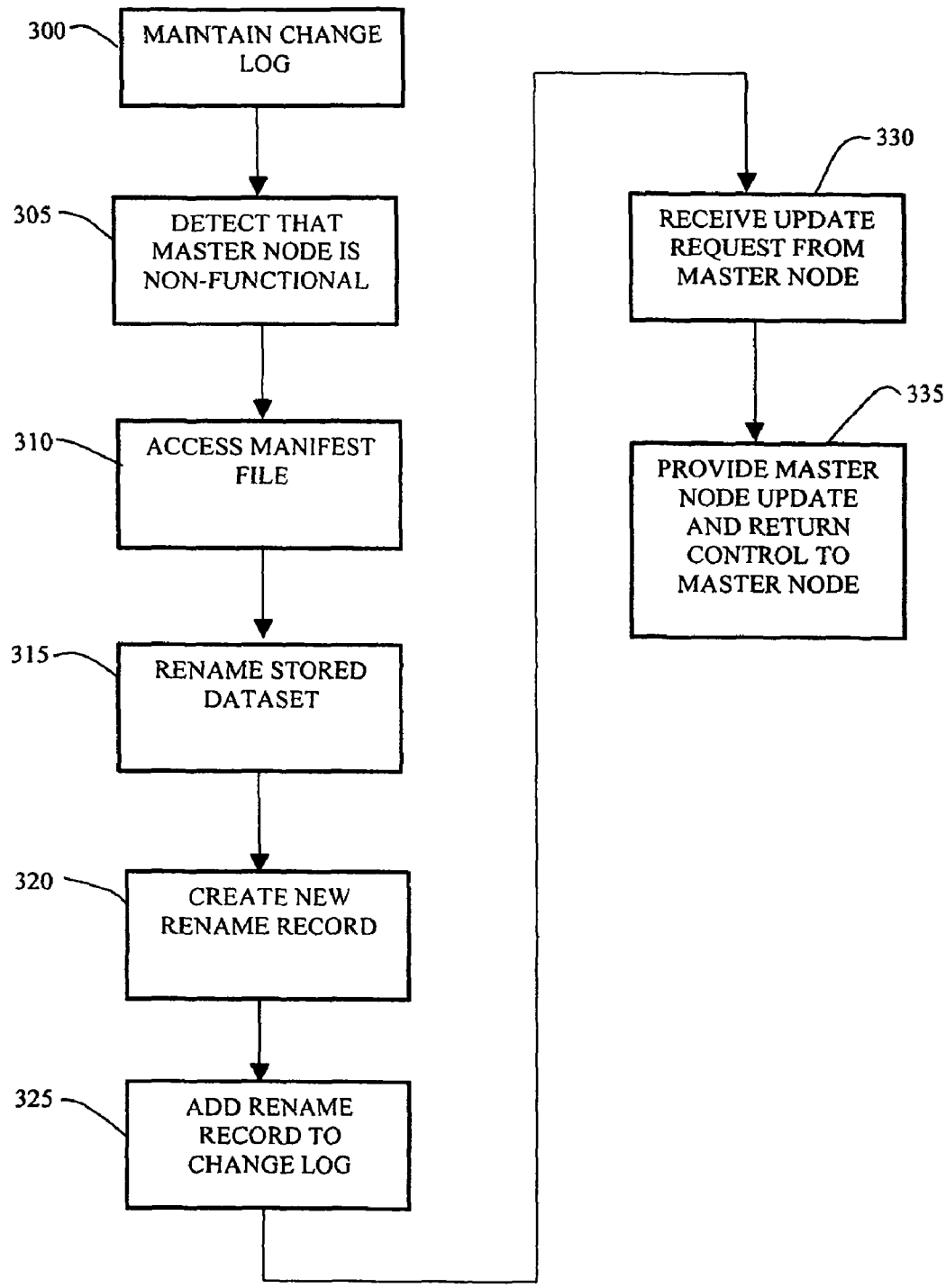
FIG. 3 is a flow chart of the process of a subordinate node becoming a responder node in the event of the failure of the master node according to principles of the invention.

FIG. 3 is a flow chart of the process of the responder 110 taking over as temporary master node when the master node 105 fails and then returning control to the master node 105 when the master node 105 recovers. Any of the subordinate nodes 110, 115, 120 is capable of taking over as temporary master node. Various conventional processes exist for electing a master node from a group of similar nodes. For example, one scheme involves electing the node having a lowest IP address. In the example implementation of the invention shown in FIG. 1, node A 110 is designated as the node to take over as temporary master node and thus is referred is as the responder.

At step 300, the responder 110 operates as a subordinate node maintaining the responder dataset 145 and responder change log 150. At step 305, the responder 110 detects that the master node 105 is non-functional. At step 310, the responder 110 accesses the manifest file 190 and the remote node 185. As temporary master, the responder 110 takes over the task of processing the manifest file 190 in order to calculate changes. As described above, the changes are based on the responder dataset 145 which could be different from the master dataset 135 and also different from the datasets 155, 165 of the other subordinate nodes 115, 120.

At step 315, the responder 110 renames the dataset 145. The new dataset name is some alphanumeric sequence calculated by the responder 110. At step 320, the responder 110 creates a new rename record 220 including the new dataset name that the responder 110 will use for the dataset 145 during the responder's tenure as temporary master node and further including the old dataset name which is the dataset name prior to the responder taking over as temporary master node.

At step 325, the responder 110 adds the rename record 220 to the responder change log 150 as the next event 202. The responder 110 then includes to the responder change log 150 any change events calculated from processing the manifest file 190 in step 310. At this point, the responder 110 is ready to receive update requests 175 from other nodes and to provide update responses 180 as will be described below with respect to FIG. 4.

Eventually, the master node 105 recovers and at step 330, the responder 110 receives an update request 175 from the master node 105. When the master node 105 recovers, the master node 105 recovers the master dataset 135 from persistent storage at the master node 105 and by consulting the temporary master node, which in this case is the responder 110. The update request 175 from the master node 105 informs the responder 110 that it should return the responsibility of processing dataset changes from the manifest file 190 to the master node 105.

At step 335, the responder provides an update response 180 to the master node 105 and returns control to the master node 105. The master node 105 acts as any requestor at this point, however, because it is the master node 105 making the request, the responder returns control to the master node 105 and the master node 105 takes the control after processing the update response. The update request 175 enables the master node 105 to learn a most recent event number and all recent events. The master node 105 provides a new dataset name and stores the new dataset name in a new rename record 220 in the master change log 140. In an alternative embodiment where the master node 105 is unable to communicate with the responder 110, the master node 105 recovers by updating the master dataset 135 and master change log 140 processing the manifest file 190 without the benefit of an update from the responder 110. The propagation processes described below with respect to FIGS. 4 and 5 are also effective in both embodiments of the master node recovery process.

Figure 4:
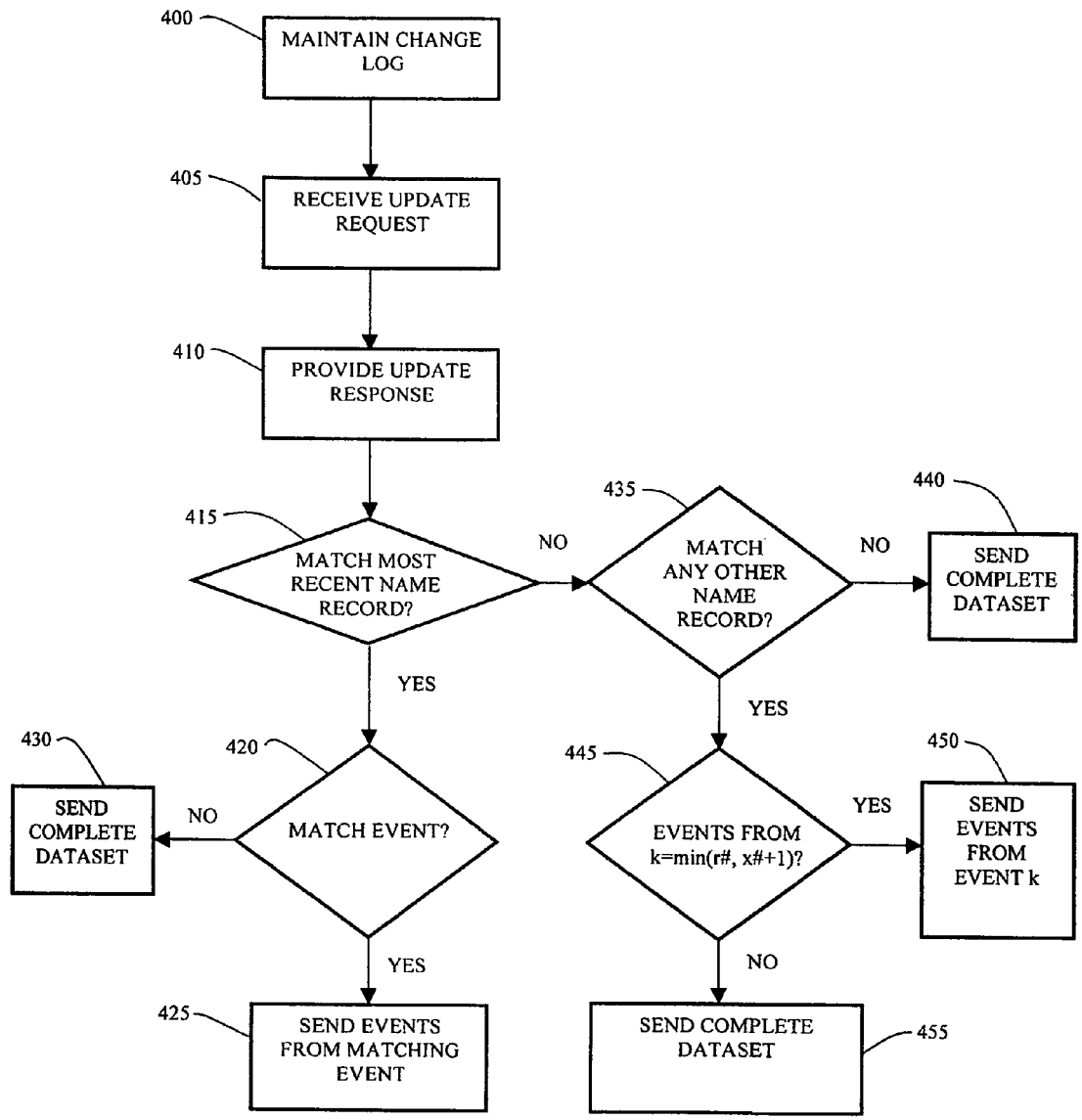
FIG. 4 is a flow chart of the operation of the responder node of FIG. 1.
Figure 5:
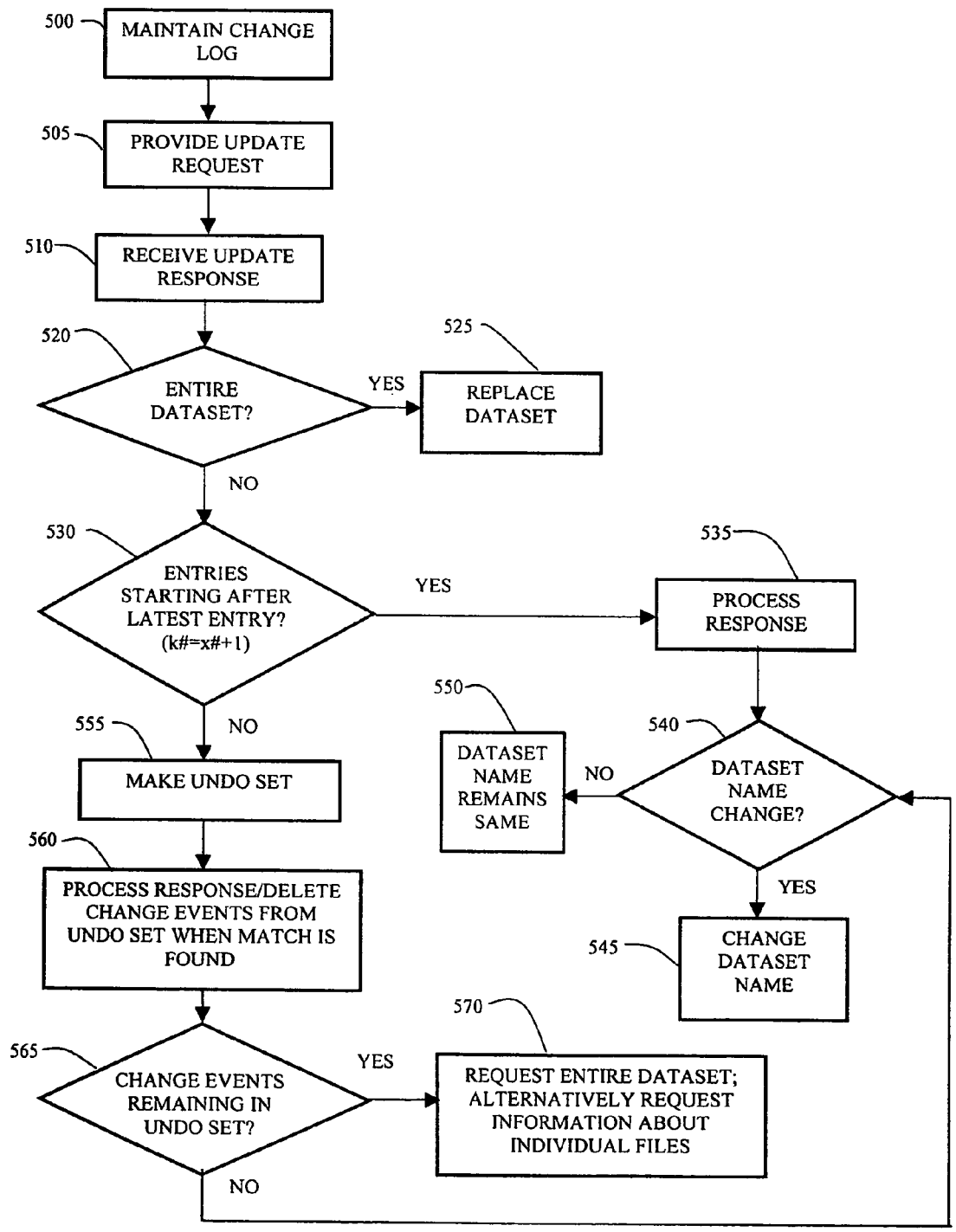
FIG. 5 is a flow chart of the operation of a requestor node of FIG. 1.

FIG. 4 is a flow chart of the operation of the responder node responding to update requests from other nodes when the responder node is acting as the temporary master node. These steps are also the steps taken by the master node when it responds to an update request. As described above with respect to FIG. 3, the responder 110 takes over as temporary master node when the responder 110 detects that the master node 105 has become non-functional.

At step 400, the responder 400 maintains the responder change log 150. The responder 400 does this by periodically accessing the remote server 185, processing the manifest file 190 to compute changes to the responder dataset 145. The responder 110 then includes the computed changes into the responder change log 150.

At step 405, the responder 110 receives an update request 175 from another node, such as the requestor 115. The update request 175, as described above, includes a most recent rename record, the number of the most recent event 202 in the requestor change log 160, and in an alternate embodiment, a channel identifier. In an alternative embodiment, the update request 175 includes all records from the rename chain 210 in the requestor change log 160.

At step 410, the responder 110 begins the process of providing an update response 180. The responder 110 extracts information from the update request 175 to compare to the responder dataset name 147 and to the information in the responder change log 150.

At step 415, the responder 110 compares the requestor dataset name 157 to the dataset name that the responder 110 is using as the responder dataset name 147. The responder 110 examines the most rename record 220 included in the update request 175 for the new dataset name 222 to find the dataset name being used by the requestor 115. If the requestor dataset name 157 matches the responder dataset name 147, the responder 110 proceeds to step 420. If the requestor dataset name 157 does not match the responder dataset name 147, the responder 110 proceeds to step 435.

At step 420, the responder 110 knows that it and the requestor 115 are operating under matching dataset names. The responder 110 now needs to determine how many change events the requestor 115 needs. The responder 110 compares the event number 204 of the most recent requestor event 202 included in the update request 175 to an event number 204 in the responder change log 150. If the responder 110 finds a matching event number in the responder change log 150, the responder 110 proceeds to step 425. If the responder 110 does not find a matching event number in the responder change log 150, the responder proceeds to step 430.

At step 425, if the responder 110 knows of no more recent events than the event in the update request 175, the responder 110 reports this fact in the update response 180 to the requestor 115. That is, the responder 110 reports to the requestor 115 that there have been no changes to the responder dataset 145 since the event in the update request 175 and consequently no changes to propagate. If the responder 110 does know of more recent events than the change event in the update request 175, then the responder 110 responds by sending to the requestor 115 the events from the responder change log 150 that are subsequent to the event provided in the update request 175.

At step 430, the responder 110 has compared the requestor most recent event provided in the update request 175 with the events stored in the responder change log 150 and has found no matching responder change log event. This means that the responder change log 150 has insufficient information to process the information provided in the update request 175. This situation can occur because the change logs 140, 150, 160, 170 are periodically truncated. In the circumstance that the responder 110 finds no matching responder change log event, the responder 110 sends the complete responder dataset 145 and the responder dataset name 147 in the update response 180 to the requestor 115. Truncation, however, is typically infrequent enough that the event is nearly always found in the change log. In an alternate embodiment, the responder 110 also includes a portion of the responder change log 150. Upon receiving a complete dataset, the requestor 115 replaces the requestor dataset 155 with the responder dataset 145. If the portion of the responder change log 150 is included in the update response 180, the requestor 115 also replaces the requestor change log 160 with the portion of the responder change log 150. This will be described more fully with respect to FIG. 5.

At step 435, the responder 110 has found no match for the most recent name record provided in the update request 175. Under these circumstances, the responder 110 reconciles dataset names, that is, the responder 110 relates the dataset name information sent by the requestor 115 with responder's own dataset name information.

Name reconciliation is done using the rename chain 210. In a first embodiment, the update request 175 included only one, the most recent, rename record. In that case, the responder 110 works backward (i.e., from the most recent to the least recent rename record) over the rename chain 210 in the responder change log 150, looking for a path from the responder dataset name 147 to the requestor dataset name 157. This search terminates successfully if the responder 110 finds a rename record 220 that contains a dataset name sent by the requestor 115 in the rename record 220 contained in the update request 175 as the old name.

In a second embodiment of the invention, the update request 175 includes all the rename records 220 from the requestor change log 160. In this embodiment the responder 110 words backwards over the rename chains 210 from both the responder change log 150 and the requestor change log 160. This search terminates successfully as soon as the responder 110 finds a rename record 220 in the responder change log 150 in which the old dataset name matches an old dataset name in a rename record 220 in the rename chain sent in the update request 175. At this point, the responder 110 has two rename records, r1 from the requestor 115 and r2 from its own change log 150. Each of these rename records 220 has a matching old dataset name 224. The reconciling entry is the rename record having the lower event number, i.e. the earlier-occurring change in the histories of the datasets 145, 155.

If the responder 110 does not find a match in either of the embodiments described above, the responder 110 proceeds to step 440. If the responder 110 does find a match in the responder change log 150 to one of the name records in the update request 175, the responder proceeds to step 445.

In step 440, the responder 110 was unable to find a rename record match in step 435. There are two reasons that a rename record match may not be found. A first reason is the responder change log 150 has been truncated removing rename records that may have matched the rename records provided by the requestor 115. The second reason is that the requestor 115 sent insufficient information, not due to truncation but rather to mismatched dataset names. That is, the requestor 115 sent an update request 175 having a requestor dataset name and one rename record 220 but the requestor dataset name does not match the responder dataset name and the rename record 220 does not match any rename record in the responder change log 150. This situation occurs when two different temporary masters take over. The solution in both these instances is to replace the requestor dataset with a complete responder dataset. Accordingly, in step 440, the responder 110 sends the complete responder dataset 145 and the responder dataset name 147 in the update response 180 to the requestor 115. In an alternate embodiment, the responder 110 also includes a portion of the responder change log 150.

At step 445, the responder 110 was able to find a rename record match, r#, in step 435. The responder 110 searches the responder change log 150 for an event corresponding to r#, an event k=min(r#, x#+1) where x# is the event number the requestor 115 sent in the update request 175. If the responder 110 finds a corresponding event, the responder 110 proceeds to step 450. If the responder 110 does not find a corresponding event, the responder proceeds to step 455.

At step 450, the responder 110 sends to the requestor 115 in the update response 180 the change events from the responder change log 150 starting from the matching event k.

At step 455, the responder 110 sends a complete dataset.

FIG. 5 is a flow chart of the operation of a requestor node of FIG. 1. At step 500, the requestor 115 maintains the requestor change log 160. The requestor 115 accomplishes this by periodically transmitting update requests 175 to the master node 105 and reconciling a received update response 180 with the requestor change log 160. The requestor 115 also updates the requestor dataset 155 according to updates to the change log 160.

At step 505, the requestor 115 provides an update request 175 to the master node 105. If the master node 105 is not functional, the responder 110 acting as the temporary master node receives the update request 175 and responds with an update response 180. The update request 175 contains, in a first embodiment, a most recent change event 202 and a most recent rename record 220 from the requestor change log 160. In a second embodiment, the update request 175 contains the most recent change event 202 and a plurality of rename records 220 from the requestor change log 160.

At step 510, the requestor 115 receives an update response 180 from the responder 110 in response to the update request 175. The update response 180 typically contains either an entire dataset or some number of change events, typically many fewer items than an entire dataset. In some instances, the update response 180 may contain only a notification that there are no changes to the dataset. If the update response 180 contains an entire dataset, the requestor 115 replaces its local information with the new information. If the update response 180 contains change events, the requestor 115 takes the change events sent to it by the responder 110 and updates the requestor change log 160 and requestor dataset 155 accordingly.

At step 520, the requestor 115 makes the determination of whether the update response 180 contains an entire dataset or only a number of change events. If the update response 180 contains an entire dataset, the requestor proceeds to step 525. If the update response 180 does not contain an entire dataset, the requestor 115 proceeds to step 530.

At step 525, the requestor 115 has received an entire dataset in the update response 180. When the update response 180 includes an entire dataset, the update response 160 also includes an updated dataset name. The requestor 115 replaces the existing requestor dataset 155 and existing requestor dataset name 157 with the received dataset and the updated dataset name from the update response 180. The requestor 115 may also receive in the update response 180 an update change log. If the requestor 115 receives an update change log in the update response 180, the requestor 115 replaces its existing change log with the update change log.

At step 530, the requestor 115 has received a number of change events in the update response 180 in which the number of change events is less than an entire dataset. Alternatively, the requestor 115 received a "no changes" notification in the update response 180. The requestor 115 now makes the determination whether the received change events are more recent than the most recent change event that the requestor 115 provided in the update request 175. If the received change events are more recent than the update request change event, the requestor 115 proceeds to step 535. If the received change events include less recent events than the update request change event, the requestor 115 proceeds to step 555. The requestor 115 makes this determination by comparing events numbers of change events received in the update response 180 with event numbers in the requestor change log 160. When the requestor 115 receives change events in response to the update request 175, the requestor 115 receives change events starting at some event number k#. k# is a smallest event number that the requestor 115 needs to know in order to synchronize the requestor dataset 155 to the responder dataset 145. k# is no larger than x#+1 (where x# is the event number the requestor 115 sent in the update request 175), but k# can be smaller than x#+1, which can occur, for example, in the case where the responder's name differed from that of the requestor 115 in the update request 175.

At step 535, k#=x#+1 is true and the requestor 115 has received change events that are more recent than the last entry in the requestor change log 160 or a "no changes" notification in the update response 180. In this step, the change events in the update response 180 are only change events that the requestor 115 was expecting. That is, the change events are more recent than the most recent change event included in the update request 175. The requestor 115, in this step, processes the update response 180. If there are no changes to make, the requestor 115 makes no changes. If there are change events in the update response 180, the requestor 115 processes the new entries for inclusion to the requestor dataset 155. The requestor 115 includes the change events into the requestor change log 160 and updates the requestor dataset 155 according to the updated requestor change log 160.

At step 540, the requestor 115 determines whether the update response 180 included a dataset name change. The dataset name change is determined by the presence of a rename record 220 in the change events included in the update response 180.

At step 545, the requestor 115 changes the requestor dataset name 157 if the update response included a rename record 220. While processing the change events in the update response 180, the requestor 115 may encounter a rename record 220. If so, the requestor 115 processes the rename record 220 by changing the requestor dataset name 157 to the new name in the rename record 220. Thus at the end of processing the update response 180, the requestor dataset name 157 corresponds to the responder dataset name 147.

At step 550, the requestor 115 has found no dataset name change in the update response 180. In this case, the requestor 115 does not change the requestor dataset name 157.

At step 555, the requestor 115 has determined that the update response 180 contains more entries than the requestor 115 expected, that is, k# is less than or equal to x#. This means that there are events in the requestor change log 169 that are not in the responder change log 150. These events need to be undone (as described below), to arrive at the requestor dataset 155 as the requestor dataset 155 existed before the inclusion of these "extra" events. In other words, the change events in the update response 180 included one or more change events that are less recent than the most recent change event included in the update request 175. These additional events result from the responder 110 processing at steps 415 or 435. The requestor 115, in this case, removes all change events with event numbers greater than or equal to k# from the requestor log 160 and places all the file names mentioned in these change events in the undo set 195. The undo set 195 holds these files while the requestor 115 processes the update response 180.

The following are examples that show that undoing is necessary in order to reliably process the update response 180 under these circumstances. A first example is that the requestor 115 learned of a new file f that was added to the dataset. The responder 110 missed this event, and by the time the responder 110 processes the manifest file 190, f was no longer in the dataset. Therefore, there will be no delete event for f in the responder change log 150. To handle things properly, the requestor 115 needs to remove f from its dataset by undoing the add event. A second example is that the requestor 115 learned of a delete of some file f and removed f from the requestor dataset 155. The responder 110 missed this event, and by the time the responder 110 processes the manifest file 190, f is back in the dataset. Therefore, there will typically be no add event for file f in the responder dataset 145. To handle things properly, the requestor 115 needs to undo its delete for file f, causing file f to reappear in the requestor dataset 155. A third example is that the requestor 115 learned of new information for some file f, for example, via an add record. In this example, the responder 110 misses this change event, and by the time the responder 110 processes the manifest file 190, the information associated with file f reverts to its former state. There will be no add event for file f with the previous information in the responder change log 160 because the responder 115 saw no change. To handle this situation properly, the requestor 115 must replace the information it currently has associated with file f with the previous information.

The undo set 195 overcomes the problem that the requestor 115 is generally unable to undo events locally. The requestor 115 is not able to undo a delete event because when a delete event is processed, all information about the deleted file is discarded. The requestor 115 also is unable to locally undo an add event because the requestor 115 does not retain any information about what information was associated with the added file previously. For example, the requestor 115 cannot distinguish between an add event that added the file to the dataset, and an add event that merely changed the information associated with the file. The undo set 195 preserves the change events acquired by the requestor 115 while enabling the requestor 115 to process an update response 180 using the requestor dataset 155 and requestor change log 160 as they existed before the acquired events. This avoids the errors illustrated in the examples above.

At step 560, the requestor 115, having removed the "extra" change events from the requestor change log 160, processes the update response 180 and the undo set 195. As the requestor 115 goes through each change event contained in the update response 180, the requestor 115 looks for a matching file in the undo set 195. When the requestor 115 finds a matching file in the undo set 195, the requestor 115 deletes the file from the undo set 195. At the end of this processing, the undo set 195 contains only names of files that were affected by the discarded change events, but not by the new change events from the update response 180. In practice, the undo set 195 would typically be empty.

At step 565, the requestor 115 determines whether there are files remaining in the undo set 195. If there are files remaining in the undo set 195, the requestor 115 proceeds to step 570.

At step 570, the requestor 115, in a first embodiment of the invention, requests an entire data set from the responder 110 because the files remaining in the undo set indicate a lack of synchronicity between the requestor dataset 155 and the responder dataset 145. In a second embodiment the invention, the requestor 115 requests status information about each file remaining in the undo set 195 and updates the requestor change log 160 accordingly. In a further alternative embodiment, the reply to the status request is based on more recent events and the responder 110 sends any new change events in the reply as well as the requested status information. This enables the requestor 115 to ensure that the requestor change log 160 remains consistent with the requestor dataset 155.

If there are no files remaining in the undo set 195, the requestor 115 proceeds to step 540, also described above. At step 540, the requestor 115 determines whether the update response 180 included a dataset name change. The dataset name change is determined by the presence of a rename record 220 in the change events included in the update response 180.

At step 545, the requestor 115 changes the requestor dataset name 157 if the update response included a rename record 220. While processing the change events in the update response 180, the requestor 115 may encounter a rename record 220. If so, the requestor 115 processes the rename record 220 by changing the requestor dataset name 157 to the new name in the rename record 220. Thus at the end of processing the update response 180, the requestor dataset name 157 corresponds to the responder dataset name 147.

At step 550, the requestor 115 has found no dataset name change in the update response 180. In this case, the requestor 115 does not change the requestor dataset name 157.

The system and methods described above enable information about the content of a very large, slowly changing dataset to be propagated using change information even when the server responsible for computing the content of the dataset fails and another server takes over. The system and methods described above are particularly useful when the dataset is very large and is recomputed periodically using a computation that is costly in some way, e.g., in terms of network bandwidth, so that only one node should perform the computations. In addition, the system and methods are advantageous where changes to the dataset occur relatively frequently but the number of changes over some time interval such as an hour is small relative to the size of the dataset, and also where many nodes require an up-to-date copy of the dataset. These conditions make it desirable to do the computation in one caching node and to propagate information about the computed result by describing changes. When the original node computing the dataset fails, the system and methods described herein enable a backup node to take over the computation. The backup node is able to continue propagating dataset changes through change events rather than sending complete datasets.

The benefits of the present system and methods are particularly valuable when some of the nodes that require information about the dataset are behind slow or low-bandwidth links, because in this case the cost of re-sending the entire dataset is extremely high.

In alternate embodiments of the invention, the change event propagation structure includes additional layers of organization hierarchy. Rather than accessing one node, the master node, for updates, the caching nodes are arranged in a tree structure in which a child node requests updates from a parent node or some ancestor node other than a root node. This embodiment avoids congestion at the master node for access to dataset changes in a system having many caching nodes. In a further alternative embodiment, the responder node sends a portion of the responder change log when sending an entire dataset as an update response. This further alternative embodiment, enables the requesting child node to provide update responses to other nodes farther down the tree.

In another alternative embodiment, the caching nodes store pre-state information rather than implement undo sets. The pre-state information is stored undo information. This information is needed for all add and delete events in the log; in each case what is needed is the previous state of that file. The requestor could then use the undo information to undo the adds and deletes by restoring each file entry to its prior state. The information could be kept in the add and delete events, or in a separate data structure. This embodiment solves the problem of dealing with additional change events in an update response described above, however, storing pre-states increases storage and processing requirements in each of the caching nodes.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with a method for efficient propagation of large datasets under failure conditions that when performed on the processor, produces a process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with a method for efficient propagation of large datasets under failure conditions that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A requesting node computerized device, comprising:
a storage device configured to store
a dataset replicated from a master dataset the dataset being a set of files associated with a channel in a content distributed network, the master dataset being built in response to evaluating a set of rules stored in a manifest file; and
a change log that describes one or more changes to the dataset, where the one or more changes are recorded as a list of events, and where the list of events includes one or more of, a record of a file being added to the dataset, and a record of a file being deleted from the dataset, and
where the list of events includes an indicator chain configured as a rename chain having rename records, where a rename record includes a new dataset name produced by a current responder node configured to propagate information concerning the master dataset and an associated old dataset name produced by a previous responder node configured to propagate information concerning the master dataset, and where a link in the indicator chain represents an indicator of dataset commonality, where dataset commonality identifies whether a node has the same dataset as a responder node; and
a controller coupled to the storage device and the memory, the controller being configured:
to maintain the change log,
to provide an update request to a responder node to update the dataset, the update request comprising a first reference to the list of events and a second reference to the indicator chain, where the second reference is a reference to at least one rename record of the indicator chain,
to receive an update response from the responder node, the update response comprising events that the change log is missing, and that are derived from the first reference and the second reference, where the events that the change log is missing are derived, at least in part, from the reference to the at least one rename record, and
to reconcile the change log and the update response to update the dataset to make the dataset substantially current to the master dataset.

2. The computerized device of claim 1, where the second reference to the indicator chain comprises a most recent rename record.

3. The computerized device of claim 1, where the second reference to the indicator chain comprises a plurality of rename records in the indicator chain.

4. The computerized device of claim 1, where the dataset comprises a stored name,
where the updated response received by the controller comprises a new rename record, and
where the controller is configured to reconcile the change log and the update response by changing the stored name of the dataset according to the new rename record.

5. The computerized device of claim 1, where an indicator chain stored in the storage device comprises at least one link, where a link in the indicator chain is a record of the name of the dataset comprising a new dataset name and an associated previous dataset name, and where the controller is configured to receive an update response from the responder node, the update response comprising information about a responder dataset derived from the first reference and the second reference, where the received update response is generated by comparing the indicator chain of the dataset taken from the second reference in the update request to an indicator chain of the responder dataset.

6. The computerized device of claim 5, where the controller is configured to add a link to the indicator chain stored in the storage device when the controller is informed that the master dataset is processed by a different node and where the link includes the previous dataset name and a new dataset name.

7. The computerized device of claim 1, where the first reference comprises a most recent event in the change log, where the second reference matches an indicator in a responder indicator chain at the responder node, where the update response contains change events that follow the most recent event, and where the controller is configured to reconcile the change log and the update response by adding the change events contained in the update response to the change log, and to modify the dataset according to the change log including the change event.

8. The computerized device of claim 1, where the update response is a complete dataset, the update response further comprising a partial change log used by the computerized device as a new change log, and where the controller is configured to reconcile the change log and the update response by replacing the dataset with the complete dataset, and replacing the change log with the partial change log.

9. A responder node computerized device to maintain a stored dataset to be replicated to at least one other node, comprising:
a storage device storing configured to store:
a dataset comprising a set of files associated with a channel in a content distributed network, the dataset being built in response to evaluating a set of rules stored in a manifest file; and
a change log that describes one or more changes to the dataset, where the one or more changes are recorded as a list of events, and where the list of events includes one or more of, a record of a file being added to the dataset, and a record of a file being deleted from the dataset, and
where the list of events includes an indicator chain configured as a rename chain having rename records, where a rename record includes a new dataset name produced by a current responder node configured to propagate information concerning a master dataset and an associated old dataset name produced by a previous responder node configured to propagate information concerning the master dataset, and where a link in the indicator chain represents an indicator of dataset commonality, where dataset commonality identifies whether a node has the same dataset as a responder node; and
a controller coupled to the storage device and the memory, the controller configured:
to access the manifest file to compute dataset changes;
to maintain the change log by including the computed dataset changes;
to receive an update request from a requesting node storing a replicated dataset, the update request including a first reference to a list of events in a requesting node change log and a second reference to in a requesting node indicator chain, where the second reference is a reference to at least one rename record of the requesting node indicator chain; and to provide an update response to the requesting node, the update response including events that the requesting node change log is missing, and that are derived from the change log, the first reference, and the second reference, where the events that the requesting node change log is missing are derived, at least in part, from the reference to the at least one rename record.

10. The computerized device of claim 9 wherein the second reference to the indicator chain comprises a most recent rename record.

11. The computerized device of claim 9 wherein the second reference to the indicator chain comprises a plurality of rename records in the indicator chain.

12. The computerized device of claim 9 wherein the controller is configured to provide an update response by finding a first match for the first reference in the change log, finding a second match for the second reference in a most recent link in the indicator chain, and making an update to send to the requesting node including entries from the change log based on the first reference and the second reference.

13. The computerized device of claim 9 wherein the second reference includes a plurality of rename records, and wherein the controller is configured to provide an update response by comparing the second reference to the indicator chain, if no match in the indicator chain is found, then providing the stored data set to the requesting node, if a match in the indicator chain is found, then looking for a corresponding event in the change log, if a corresponding event is found, then making an update to send to the requesting node including events more recent than the corresponding event, and if a corresponding event is not found, then providing the stored dataset to the requesting node.

* * * * *

UNITED STATES PATENT AND TRADEMARK OFFICE
CERTIFICATE OF CORRECTION

| | | |
|---|---|---|
| PATENT NO. | : 7,853,565 B1 | Page 1 of 1 |
| APPLICATION NO. | : 11/648099 | |
| DATED | : December 14, 2010 | |
| INVENTOR(S) | : Barbara Liskov | |

It is certified that error appears in the above-identified patent and that said Letters Patent is hereby corrected as shown below:

Claim 9, Column 20, line 32, delete "storing"

Claim 9, Column 20, line 63, delete "in"

Signed and Sealed this
First Day of March, 2011

David J. Kappos
*Director of the United States Patent and Trademark Office*